Figure 1:
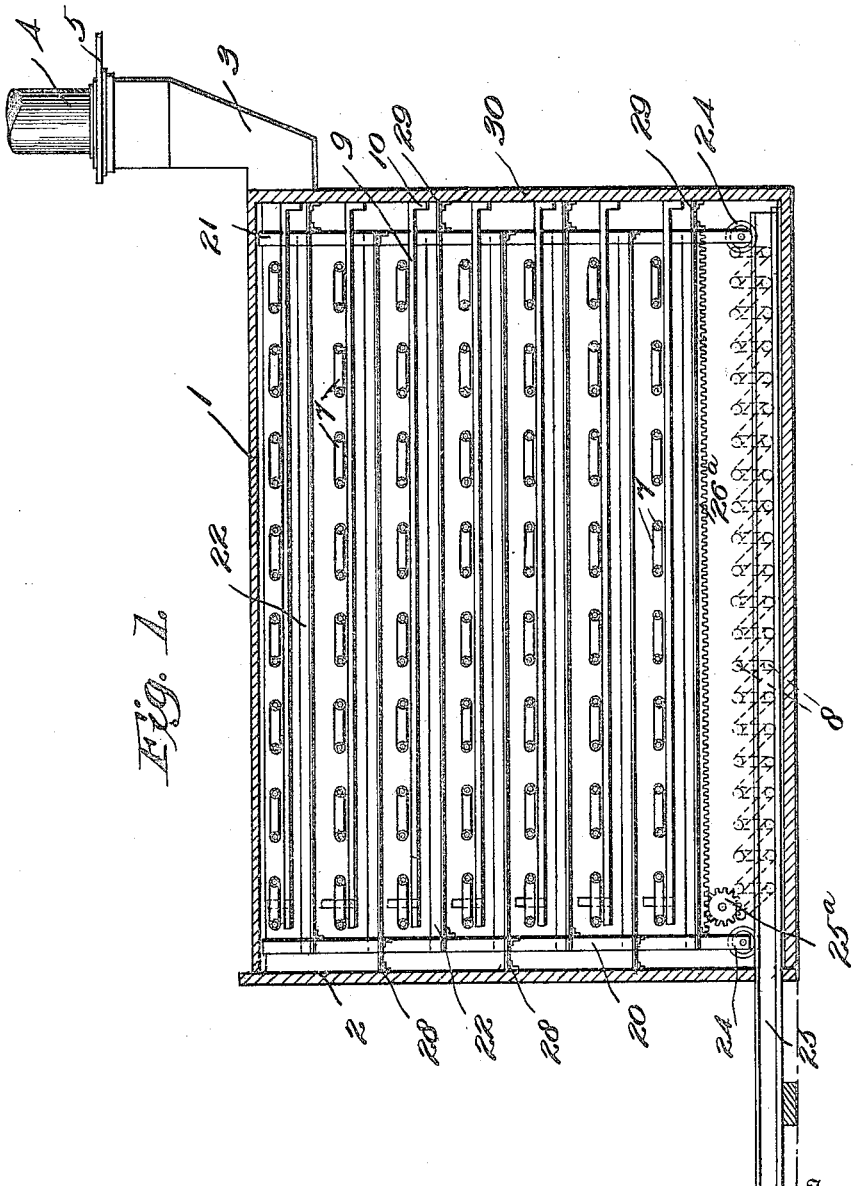

C. POMBO & T. DEL CASAL.
APPARATUS FOR DRYING COPRA.
APPLICATION FILED MAR. 28, 1914.

1,141,003.

Patented May 25, 1915.
4 SHEETS—SHEET 1.

Witnesses

Inventors,
Carlos Pombo, and
Toribio Del Casal.
By Wilkinson, Witherspoon & Mackay, Attorneys.

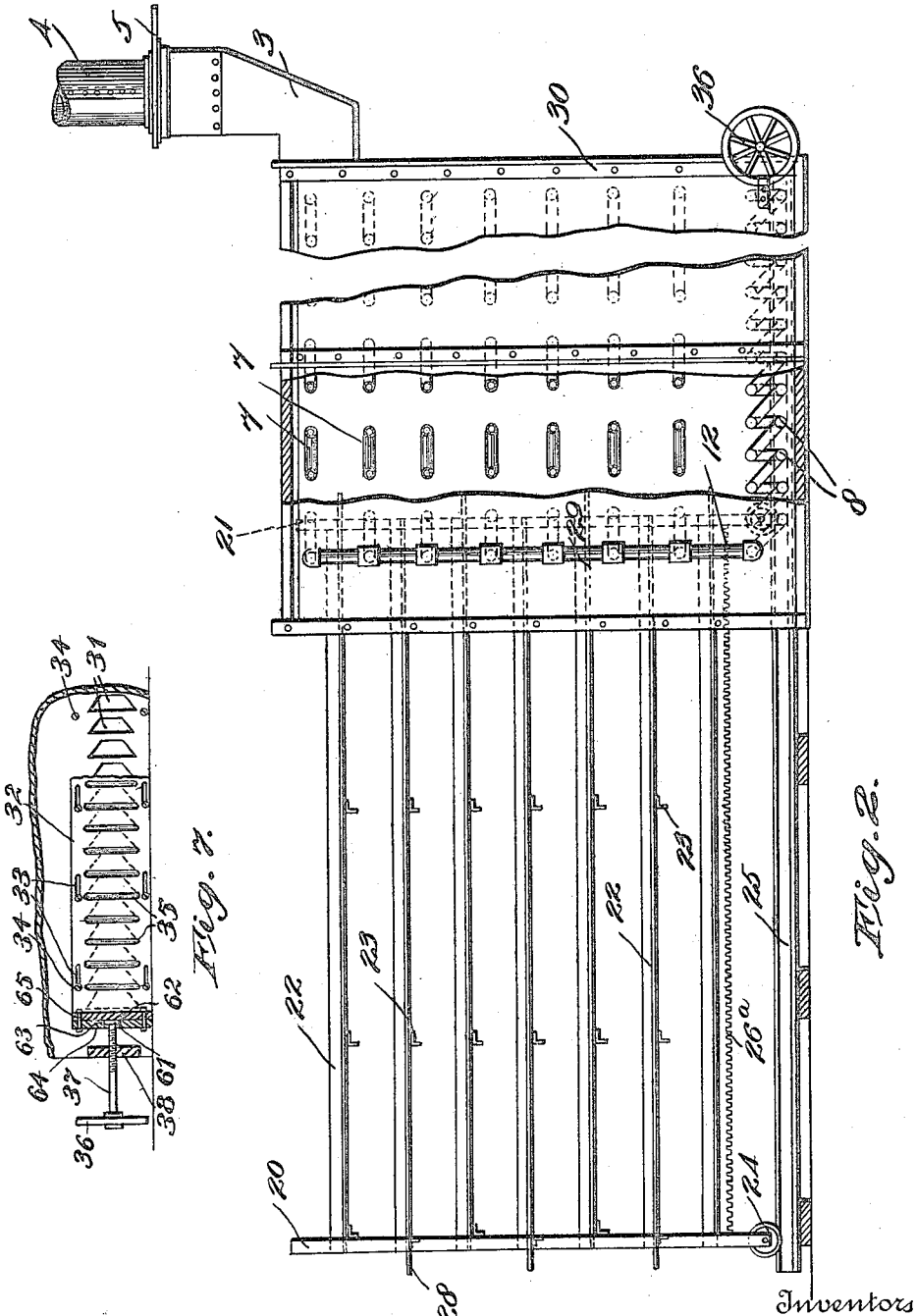

C. POMBO & T. DEL CASAL.
APPARATUS FOR DRYING COPRA.
APPLICATION FILED MAR. 28, 1914.
1,141,003.
Patented May 25, 1915.
4 SHEETS—SHEET 3.
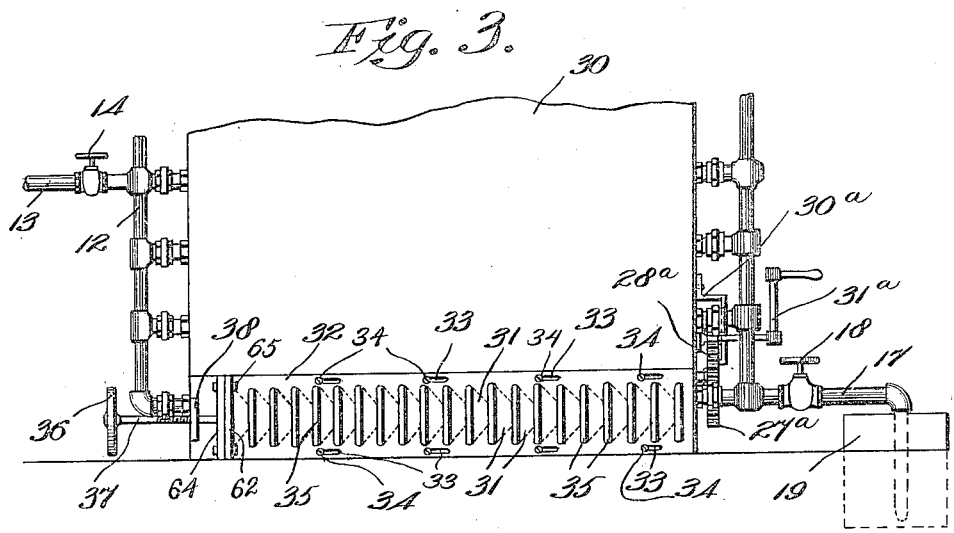
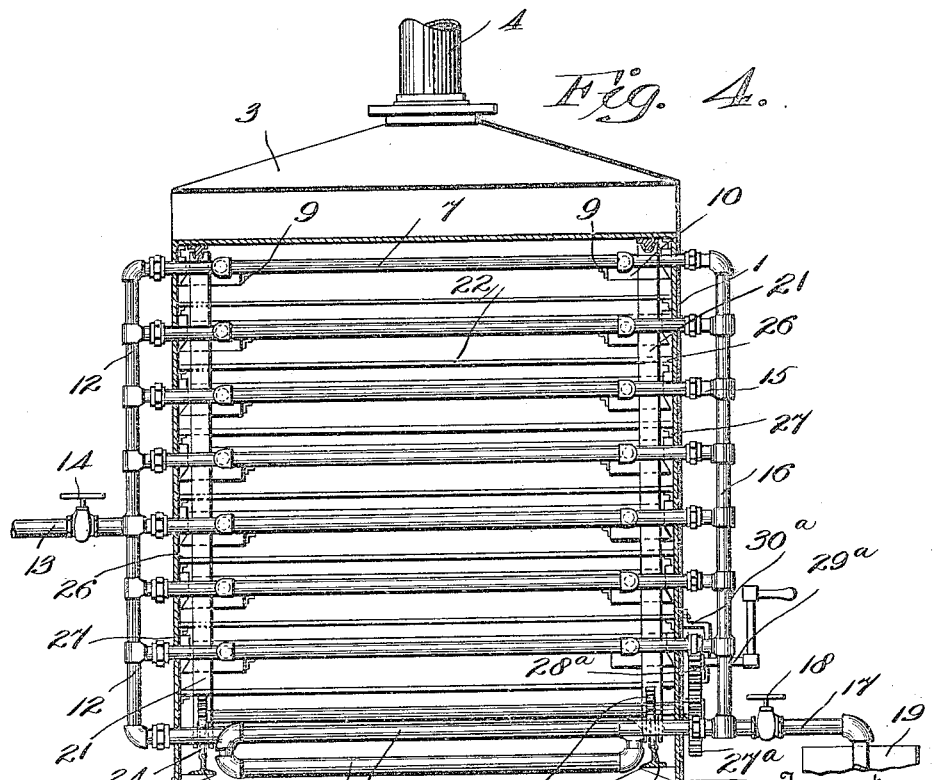
Inventors
Carlos Pombo and
Toribio Del Casal.
by Wilkinson, Witherspoon
Mackay Attorneys.

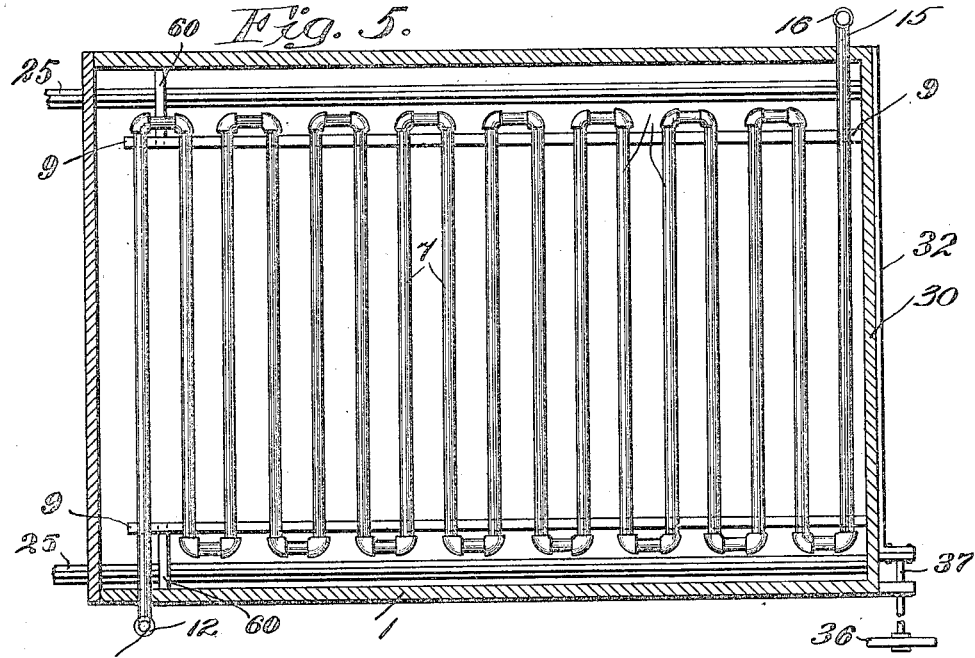
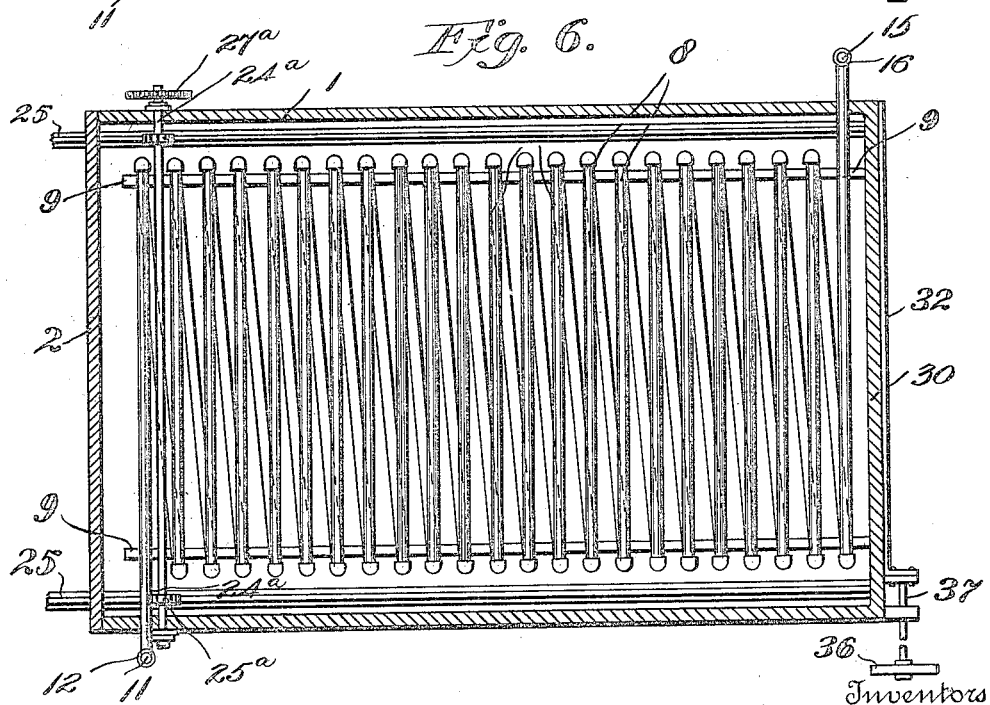

UNITED STATES PATENT OFFICE.

CÁRLOS POMBO AND TORIBIO DEL CASAL, OF MANILA, PHILIPPINE ISLANDS.

APPARATUS FOR DRYING COPRA.

1,141,003.

Specification of Letters Patent.

Patented May 25, 1915.

Application filed March 28, 1914. Serial No. 828,062.

*To all whom it may concern:*

Be it known that we, CÁRLOS POMBO and TORIBIO DEL CASAL, citizens of the United States, residing at Manila, in the Island of Luzon, Philippine Islands, have invented certain new and useful Improvements in Apparatus for Drying Copra; and we do hereby declare the following to be a full, clear, and exact description of the invention, such as will enable others skilled in the art to which it appertains to make and use the same.

The present invention relates to apparatus for drying copra, and has for its purpose to provide a means whereby large quantities of cocoanut may be treated in a single operation, and wherein all of the cocoanuts will be subjected to uniform temperature throughout the treatment.

The invention has for its further purpose to construct an apparatus which will be of simple design; which will be comparatively inexpensive; one comprising a few parts which are easily arranged and which may be readily assembled and disassembled; and one whose operation will not require any special skill on the parts of the attendants.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a longitudinal sectional view of the apparatus complete, and showing the same in position of operation; Fig. 2 is a longitudinal sectional view, partly in elevation, and showing the copra supporting carriage withdrawn; Fig. 3 is a rear end elevational view, partly broken away, and showing the air regulating valve; Fig. 4 is a transverse sectional view, partly in elevation, of the apparatus; Fig. 5 is a horizontal sectional view, illustrating the arrangement of one tier of steam conducting pipes; and Fig. 6 is a similar view, illustrating the lowermost tier of said pipes.

Referring to the construction in detail, the apparatus consists of a suitable casing 1 constructed preferably of metal, and provided at one end with a hinged door 2 adapted to be secured in closed position through the medium of any suitable securing means, such, for instance, as that type of means employed for securing the doors of safes, or the heads of digesters. At its rear end, the casing 1 is provided with a hood 3 that communicates with a flue or stack 4, and said stack is provided with a sliding valve 5 for damping purposes.

The casing 1 is adapted to provide a closed heating chamber, and has supported therein a plurality of banks or series of steam conducting pipes 7 and 8, that are mounted, each bank on a pair of rails or bars 9 of angle iron construction, and which bars are in turn mounted on the rear wall of the casing through the medium of brackets 10, and supported at their forward ends by braces 60 projecting from the side walls of the casing. Each tier or bank of pipes 7 rests upon its respective pair of supporting rails or bars 9 in the manner shown, and by reason of this manner of supporting the pipes, there are provided clearances between the respective banks of pipes and these spaces are designed to receive the shelves or trays that holds the cocoanuts ready for treatment.

Each bank or tier of pipes 7 is arranged in zigzag formation, as shown in Fig. 5, and at their forward ends 11 the several pipe tiers are connected to communicate with a distributing pipe 12, and said pipe 12 is connected with a steam supply pipe 13 that leads to the steam generating plant. A controlling valve 14 is mounted on the pipe 13 and is adapted for regulating the steam delivered to the pipes 7, as will be understood. At their opposite ends 15, the several pipe tiers are similarly connected to communicate with a common pipe 16 that leads to an outlet pipe 17 having a regulating valve 18. The outlet end of the pipe 17 leads into a receptacle 19 and from the receptacle the water of condensation may be returned to the steam generating plant, as will be readily understood.

The lowermost tier or bank of pipes 8 is arranged with the several elements thereof in vertical relation as distinct from having the same horizontally disposed, as with the pipe tiers 7; the purpose whereof being that the accumulated water due to steam condensation will collect in said pipe tier 8 and be held therein for the maximum period to recover the heat from such water of condensation before its delivery to the receptacle 19 through the outlet pipe 17. It will be further understood, of course, that the pipe tier 8 is equally as well adapted for serving as steam conducting pipes as are the pipes 7, and said pipe tier 8 would, in fact, be used in that capacity where the steam temperature would warrant such use.

The cocoanuts to be treated are adapted to be moved into and out of the heating chamber through the medium of a suitable carriage, or truck, which consists of vertically disposed end bars 20 and 21 connected by trays or shelves 22 in the manner shown in Fig. 2, and said shelves are reinforced intermediate their ends each by a pair of angle bars 23. The carriage is mounted on suitable rollers 24 journaled on the end bars 20 and 21, and said rollers are adapted to travel on tracks 25 which extend within the heating chamber for its full length (see Figs. 5 and 6), and without said chamber for substantially the length of the carriage itself (see Figs. 1 and 2). The opposite sides of each shelf 22 are extended, or formed with ledges 26 that are adapted to ride upon ledges 27 secured to the side walls of the casing. And when said carriage is completely housed within the heating chamber, the ledges 27 serve as supporting means for the shelves containing the cocoanuts. The projecting portions of the ledges 26 of the several shelves have the further function of providing a close fit between the several shelves and the walls of the heating chamber, thus dividing the apparatus while in operation into a plurality of substantially independent and superposed chambers. The means for moving the carriage into and out of the heating chamber consists of a shaft 24$^a$ journaled in the casing and having within the casing a pair of pinions 25$^a$ that mesh with a pair of racks 26$^a$ secured to the lowermost shelf 22 of the carriage. A pinion 27$^a$, mounted on one end of the shaft 24$^a$, meshes with a pinion 28$^a$ on a shaft 29$^a$ that is journaled in the casing through the medium of a bracket 30$^a$. A manipulating crank 31$^a$ is carried by the shaft 29$^a$ for actuating the rack engaging pinion 25$^a$ to move the carriage.

The alternate end portions of the several shelves of the carriage have projecting portions 28 and 29 adapted to abut against the door 2 of the chamber and the rear end wall 30 of the chamber. With this arrangement, the rear end of the carriage is prevented from abutting against said end wall 30, and the door 2 closing against the shelf extensions 28 (see Fig. 1) provides communication between the respective independent chambers, and thus brings the several chambers into inter-communication forming a circuitous path or channelway. This channelway communicates directly with the flue 6 through the hood 3 for the carrying off of the heated air.

As disclosed to advantage in Figs. 1 and 2 the tiers or banks of pipes 7 and 8 terminate at their forward ends a slight distance from the door 2, thereby providing therebetween a space for the accommodation of the standards 20 and extensions 28 of the carriage when the same is in position within the casing. After the cocoanuts have been sufficiently dried, the door 2 of the casing is opened and the carriage withdrawn, over the tracks 25 by action of the crank handle 31$^a$ and associated mechanism, until the rear standards 21 of said carriage encounter the braces 60 and forward ends 11 of the pipes 7. The carriage is thus prevented from being withdrawn entirely from the casing; but, as shown in Fig. 2, can be moved to a position where the cocoanuts or other material treated may be readily and conveniently removed from the shelves 22 and fresh material substituted to undergo similar treatment.

The rear end wall 30 of the heating chamber is provided at its lower portion with a plurality of openings 31 of truncated design, and a valve comprising a plate 32 is slidably mounted to control the amount of air admitted through the openings 31. The valve plate 32 is formed with a plurality of slots 33 engaging with pins 34 secured to the casing wall 30, and for each opening 31 the valve plate is provided with a vertically disposed and narrow slot 35, which is arranged to be brought into registry with its respective opening 31 and moved across the same from the direction of the apex to the base thereof, and thereby regulates the amount of air admitted. The plate 32 is adapted to be operated through the medium of a hand turning wheel 36 mounted on a threaded bar 37 that has screw engagement with its support 38, as clearly shown in Fig. 3. The threaded bar 37 is provided with a head 61 bearing against a flange 62 formed on the valve plate 32, and the head 61 is arranged to lie in a socket 63 in a plate 64 secured to the flange 62 by bolts 65 or otherwise. It will be understood that the head 61 turns with the bar 37, when the latter is manipulated by the wheel 36, and the socket 63 forms a bearing for the same. In opening the valves to secure greater air supply the wheel 36 is operated to turn the bar 37 in a left-hand direction, whereby the latter is moved to the left through the support 38 drawing thereafter the valve plate 32 through the head 61, plate 64, bolts 65 and flange 62. When it is desired to reduce the air supply the shaft, through the hand wheel 36, is moved to the right whereupon the head 61 bears directly against the flange 62 and carries the valve plate 32 before it.

Should the apparatus be placed higher than the water line of the steam generator, open the steam valve of the pipe connecting with the bottom of the boiler, and the banks of steam pipes inside the apparatus will be kept full of steam continually and the condensed steam passed to the generator boiler. Should the exhaust steam pipe be connected to deliver into the receptacle 19, care must be taken to drain the condensed steam whereby to avoid the lowering of the temperature. When the evaporation begins, the incoming air valve should be regulated to avoid lowering of the temperature, and to establish the proper circulation of air through the circuitous passageway in order to absorb the mixture and draw off the steam which is passed through the flue.

It is obvious that those skilled in the art may vary the details of construction and arrangement of parts without departing from the spirit of our invention, and therefore we do not wish to be limited to such features except as may be required by the claims.

We claim:—

1. In a copra drying apparatus, the combination of a closed casing, a plurality of banks of steam conducting pipes mounted within the casing and disposed in spaced and superposed relation, a carriage having a plurality of superposed shelves adapted to enter the spaces between said superposed banks of pipes, and means for moving the carriage into and out of said casing.

2. In a copra drying apparatus, the combination of a closed casing providing a heating chamber, a carriage having a plurality of superposed shelves movable into and out of said chamber, a plurality of steam conducting pipes mounted in the casing and disposed above and beneath said shelves, a rack carried by the carriage, and a pinion journaled on said casing and adapted to engage with said rack for moving said carriage into and out of the casing.

3. In a copra drying apparatus, the combination of a closed casing providing a heating chamber, a carriage having a plurality of superposed shelves movable into and out of said chamber, said shelves having their respective alternate ends extended whereby to provide a tortuous passage between the several shelves and the casing when the carriage is in said casing, and a plurality of steam conducting pipes mounted in the casing and disposed above and beneath said shelves.

4. In a copra drying apparatus, the combination of a closed casing having supporting ledges mounted on the side walls thereof, a carriage having a plurality of superposed shelves movable into and out of said chamber, each of said shelves having projecting side portions adapted to rest upon said ledges to support the shelves, a plurality of steam conducting pipes arranged above and beneath said shelves in the casing, and supporting bars for said steam pipes mounted in said casing.

5. In a copra drying apparatus, the combination of a closed casing having supporting ledges mounted on the side walls thereof, a carriage having a plurality of superposed shelves movable into and out of said chamber, each of said shelves having projecting side portions adapted to rest upon said ledges to support the shelves, and the respective alternate ends of said shelves being extended whereby to provide a tortuous passage between the several shelves and the casing when the carriage is in said casing, and a plurality of steam conducting pipes mounted in the casing and disposed above and beneath said shelves.

In testimony whereof, we affix our signatures, in presence of two witnesses.

CÁRLOS POMBO.
TORIBIO DEL CASAL.

Witnesses:
A. GOMEZ SEWARD,
ALBINO Z. SYLIP.

Copies of this patent may be obtained for five cents each, by addressing the "Commissioner of Patents, Washington, D. C."